United States Patent [19]

Kakui

[11] Patent Number: 5,900,970
[45] Date of Patent: May 4, 1999

[54] OPTICAL FILTER AND OPTICAL TRANSMISSION SYSTEM HAVING THE SAME

[75] Inventor: Motoki Kakui, Yokohama, Japan

[73] Assignee: Sumitomo Electric Industries, Ltd., Osaka, Japan

[21] Appl. No.: 08/843,853

[22] Filed: Apr. 17, 1997

[30] Foreign Application Priority Data

Jun. 11, 1996 [JP] Japan .................................. 8-149395

[51] Int. Cl.⁶ .............................. H01S 3/19; G02B 6/34
[52] U.S. Cl. ........................ 359/341; 359/130; 359/337; 385/37
[58] Field of Search .................... 359/130, 337, 359/341; 385/37

[56] References Cited

U.S. PATENT DOCUMENTS

| | | | |
|---|---|---|---|
| 5,239,410 | 8/1993 | Nishimura et al. | 359/344 |
| 5,271,024 | 12/1993 | Huber | 359/341 |
| 5,430,817 | 7/1995 | Vengsarkar | 385/37 |
| 5,583,689 | 12/1996 | Cassidy et al. | 359/341 |
| 5,608,571 | 3/1997 | Epworth et al. | 359/341 |
| 5,623,565 | 4/1997 | Blair et al. | 385/24 |
| 5,638,301 | 6/1997 | O'Sullivan et al. | 385/24 |
| 5,668,821 | 9/1997 | Hodgson et al. | 372/6 |
| 5,701,186 | 12/1997 | Huber | 359/125 |

FOREIGN PATENT DOCUMENTS 766423  4/1997  European Pat. Off. .

OTHER PUBLICATIONS

Long–Period Fiber Gratings as Gain–Flattening and Laser Stabilizing Devices, A.M. Vengsarkar et al, pp. 3–4.
Temperature–Insensitive Long–Period Fiber Gratings, Justin B. Judkins et al.
Proc. 21st. Eur. conf. on Opt. Comm. (OCOC95–Brussels) 100 Gb/s WDM Transmission of twenty 5 Gb/s NRZ Data Channels Over Transoceanic Distances Using a Gain Flattened Amplifier Chain, Neal S. Bergano et al, pp. 967–970.

Vengsarkar, A.M., Laser Focus World, vol. 32, #6, pp. 243–246, 248, Jun. 1996; abst. only herewith.

Vengsarkar et al, Optics Letters, vol. 21, #5, Mar. 1, 1996, pp. 336–338; abst. only herewith.

Strasser, TA, LEOS 95, Oct. 30–31, 1995, vol. 2, pp. 287–288, N.Y.C., N.Y.; abst. only herewith.

*Primary Examiner*—Nelson Moskowitz
*Attorney, Agent, or Firm*—Pillsbury Madison & Sutro LLP

[57] ABSTRACT

The present invention relates to an optical filter for flattening the gain spectrum of an optical amplification system (including at least one optical amplifier) inserted in a transmission line for transmitting a plurality of signal light components having wavelengths different from each other, and a transmission system including the optical filter. The optical filter according to the invention has a transmission spectrum with inverse characteristics to those of the gain spectrum of the optical amplification system for amplifying the plurality of signal light components. Particularly, the transmission spectrum of the optical filter is characterized in that, in the second wavelength range narrower than the first wavelength range corresponding to the signal light wavelength range and included in the first wavelength range, the difference between the maximum loss and the minimum loss of the transmission spectrum substantially equals the difference between the maximum gain and the minimum gain of the gain spectrum of the optical amplification unit in the first wavelength range.

10 Claims, 6 Drawing Sheets

OPTICAL FILTER AND OPTICAL TRANSMISSION SYSTEM HAVING THE SAME

BACKGROUND OF THE INVENTION

1. Field of the Invention

The present invention relates to an optical filter applicable to an optical fiber transmission network for realizing long-distance large-capacity transmission of signal light components having wavelengths different from each other (to be referred to as wavelength-multiplexed signal light hereinafter) and an optical transmission system having the optical filter.

2. Related Background Art

Conventionally, large-capacity high-speed communication such as image communications or long-distance communication such as international communication has been performed using an optical fiber transmission network. From the viewpoint of large-capacity high-speed communications, these recent communication techniques mainly employ wavelength division multiplexing optical transmission (WDM optical transmission) for transmitting wavelength-multiplexed signal light through an optical transmission line. In addition, from the viewpoint of long-distance communication, optical amplifiers for amplifying signal light components are sometimes arranged in the optical fiber transmission line.

An Er-doped optical fiber amplifier (EDFA) generally used as the optical amplifier can amplify wavelength-multiplexed signal light components having wavelengths within the 1.55 $\mu$m wavelength band at once.

The gain spectrum, being wavelength dependant is not flat but changes depending on the wavelength of the wavelength-multiplexed signal light. Generally, the gain spectrum has a tendency to have the gain at a maximum near the center wavelength of the wavelength band of the wavelength-multiplexed signal light and becomes smaller as the wavelength shifts from the center wavelength. The wavelength band of the wavelength-multiplexed signal light is defined as a difference between a maximum wavelength and a minimum wavelength of the wavelength-multiplexed signal light.

Signal light components having wavelengths different from each other, which are outputted from the EDFA, have different intensities depending on the wavelengths. When a number of EDFAs are arranged in the optical fiber transmission line, the signal light components have a predetermined intensity at the transmission terminal of the optical fiber. At the reception terminal of the optical transmission line, however, the intensity ratio between the signal light components becomes higher. In some cases, one of a plurality of signal light components may have a sufficient intensity at the reception terminal while the remaining signal light components may have lower intensities and therefore cannot be received.

Studies have been made to arrange, in the optical fiber transmission line, an optical filter (equalizer) having a transmission spectrum (loss spectrum) for canceling the gain spectrum of the EDFA such that the gain spectrum of the entire transmission line is flattened. The transmission spectrum of this optical filter has reverse characteristics to those of the gain spectrum. The transmission loss is maximum near the center wavelength within the band of wavelength-multiplexed signal light and becomes smaller as the wavelength shifts from the center wavelength. For such an optical filter, application of a fiber grating having an appropriately designed period has been examined.

For example, a technique is disclosed in A. M. Vengsarkar et al., "Long-period fiber gratings as gain-flattening and laser stabilizing devices" in which two fiber gratings having grating periods different from each other are cascaded and used as the optical filter, and the gain spectrum of the EDFA is canceled by the transmission spectrum of this optical filter to reduce the difference between the maximum gain and the minimum gain of the gain spectrum of the entire transmission line in the band of wavelength-multiplexed signal light to 0.2 dB or less.

SUMMARY OF THE INVENTION

The present inventor has studied the prior art and found the following problem.

Since the grating period or refractive index of the conventional optical filter largely depends on temperatures, the center wavelength (the transmission loss decreases from this center wavelength toward the long and short wave sides) for giving the maximum loss changes (0.05 to 0.15 nm/° C.). Therefore, in case of a change in temperature, the transmission spectrum of the optical filter changes so the gain spectrum of the EDFA is insufficiently canceled. Therefore, the difference between the maximum and minimum gains of the gain spectrum of the entire optical fiber transmission line including the EDFA and the optical filter increases. In addition, in the prior art, an optical filter having an optimum transmission spectrum capable of canceling the gain spectrum of the EDFA can hardly be manufactured.

To reduce the dependency on the temperature, an optical filter in which a grating is formed in an optical fiber having a specific refractive index profile is proposed by L. B. Judkins et al., "Temperature-insensitive long-period fiber gratings", OFC '96, PD1. In this optical filter, the dependency of the center wavelength for giving the maximum loss on the temperature is smaller by one order of magnitude. However, for this optical filter, a complex refractive index profile must be considered even for the cladding portion that is normally almost neglected. For this reason, performance prediction for designing an optical filter having a predetermined transmission spectrum can hardly be made by simulation or the like, and the optical filter can hardly be manufactured.

An object of the present invention is to provide an optical filter for flattening the gain spectrums of a plurality of signal light components which are amplified by an optical amplification system inserted in a transmission line, and an optical transmission system having the optical filter.

Figure 1:
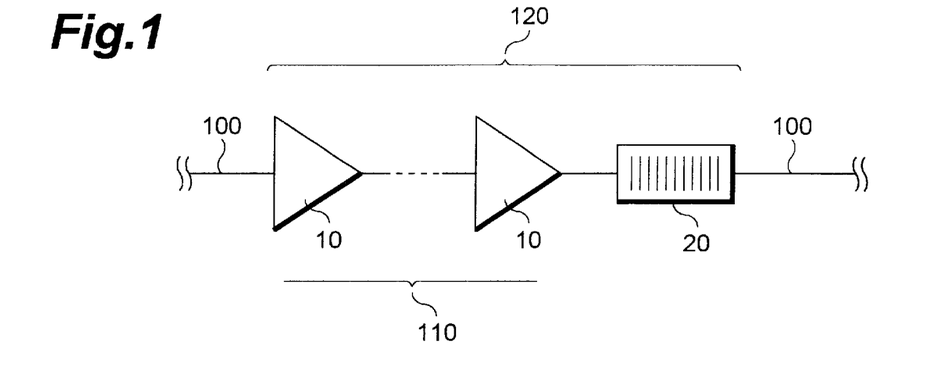
FIG. 1 is a view showing the basic structure of an optical transmission system (including an optical amplification system) according to the present invention.

More specifically, an optical transmission system according to the present invention comprises an optical amplification system 120 inserted in a transmission line capable of transmitting a plurality of signal light components having wavelengths different from each other, as shown in FIG. 1. The optical amplification system 120 comprises an optical amplification unit 110 (including at least one optical amplifier 10) and an optical filter 20.

The optical filter 20 has a transmission spectrum 20a with inverse characteristics to those of a gain spectrum 10a of the optical amplification unit 110. In this specification, the characteristic of the optical filter for canceling the gain of the optical amplification unit 110 and flattening the gain spectrum of the amplified signal light components will be referred to as an equalizing characteristic hereinafter.

Figure 2:
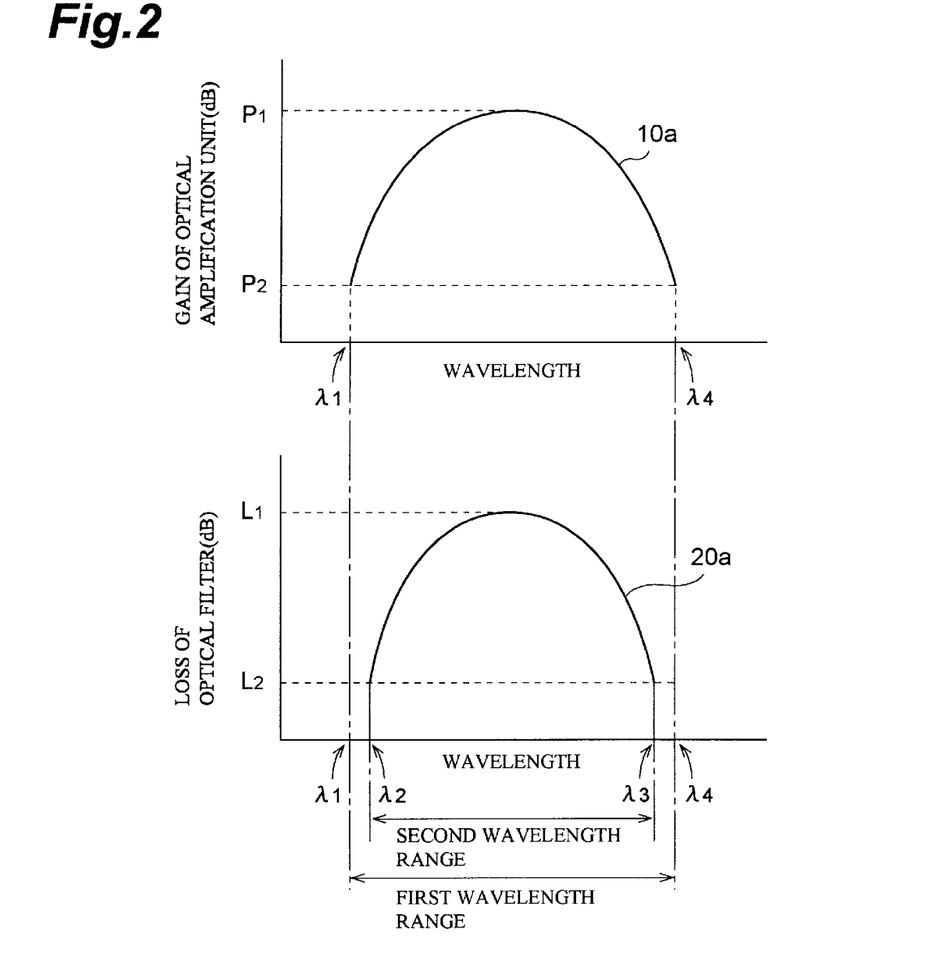
FIG. 2 is a graph for explaining the transmission spectrum (loss spectrum) of an optical filter according to the present invention in comparison with the gain spectrum of an optical amplification unit.

The transmission spectrum 20a of the optical filter 20 is characterized in that, in the second wavelength range ($\lambda_3$–$\lambda_2$) narrower than the first wavelength range ($\lambda_4$–$\lambda_1$) and included in the first wavelength range, the difference between a maximum loss $L_1$ and a minimum loss $L_2$ of the transmission spectrum 20a substantially equals the difference between a maximum gain $P_1$ and a minimum gain $P_2$ of the gain spectrum of the optical amplification unit 110 in the first wavelength range. In this specification, the first wavelength range is a range defined by the difference between the maximum wavelength $\lambda_4$ and the minimum wavelength $\lambda_1$ (<$\lambda_4$) of the signal light components to be transmitted. The second wavelength range is a range defined by the wavelength $\lambda_2$ (>$\lambda_1$) and the wavelength $\lambda_3$ ($\lambda_2$<$\lambda_3$<$\lambda_4$) at which, in the transmission spectrum 20a of the optical filter 20, the difference between the maximum loss $L_1$ and the minimum loss $L_2$ of the transmission spectrum substantially equals the difference between the maximum gain $P_1$ and the minimum gain $P_2$ of the optical amplification unit 110. That is, at the wavelengths $\lambda_2$ and $\lambda_3$, the transmission loss of the optical filter 20 is the value $L_2$ for satisfying a relation $L_1$–$L_2$=$P_1$–$P_2$.

The second wavelength range is preferably 65% to 97% of the first wavelength range. For the optical filter 20 serving as an equalizer, the second wavelength range is set to be narrower than the first wavelength range. For this reason, even when a center wavelength shift is caused by a change in temperature or variations in manufacturing conditions, the equalizing characteristic of the optical filter 20 does not degrade, or if any, the degradation of the equalizing characteristic can be minimized so that the allowance for a change in temperature or variations in manufacturing conditions is increased. Therefore, the equalizing characteristic is improved as compared with an optical transmission system having an optical filter with a transmission loss for exactly canceling the gain spectrum of the optical amplifier. In this specification, the center wavelength shift means a change in wavelength (center wavelength of the transmission spectrum) for giving the maximum loss in the second wavelength range of the optical filter 20 and mainly depends on a change in temperature. Of course, the second wavelength range will also shift within the first wavelength range, on the basis of the center wavelength shift of the optical filter 20.

The output spectrum of the entire optical amplification system 120 according to the present invention is obtained by integrating the gain spectrum of the optical amplification unit 110 (including the plurality of optical amplifiers 10) and the transmission spectrum of the optical filter 20. The optical filter functions to flatten the output spectrum. Since the optical filter 20 has an increased allowance for the center wavelength shift caused by a change in temperature or variations in manufacturing conditions, the optical transmission characteristic of the entire transmission system does not degrade, or if any, the degradation of the characteristic can be minimized.

As the optical filter 20 according to the present invention, e.g., a fiber grating can be used. The fiber grating is obtained by forming a diffraction grating in a single-mode optical fiber along its longitudinal direction (corresponding to a light traveling direction). When the optical amplification system 120 to be inserted in the transmission line 100 is constituted by the optical filter 20, i.e., the fiber grating, the optical amplification system 120 can be made compact and inexpensive. In addition, the insertion loss in inserting the optical amplification system 120 in the transmission line 100 constituted by, e.g., an optical fiber can be minimized. Furthermore, the optical amplification system 120 can be easily designed and manufactured.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENT

An optical filter according to the present invention and an optical transmission system having the optical filter will be described below with reference to FIGS. 1 to 9.

FIG. 1 is a view showing the basic structure of an optical transmission system according to the present invention. Referring to FIG. 1, the optical transmission system comprises at least a transmission line 100, and an optical amplification system 120 inserted in this transmission line 100. The optical amplification system 120 comprises an optical amplification unit 110 for amplifying a plurality of signal light components included in the first wavelength range, and an optical filter 20 for flattening the gain spectrum (FIG. 2) of the optical amplification unit 110. The optical amplification unit 110 includes at least one optical amplifier 10. The first wavelength range includes the plurality of signal light components and is defined by the difference between the maximum wavelength and the minimum wavelengths of the signal light components.

FIG. 2 is a graph illustrating the gain spectrum of the optical amplifier 10 (or the optical amplification unit 110) for amplifying signal light components to be input to the optical filter 20 according to the present invention and the transmission spectrum of the optical filter 20. In general, when a plurality of signal light components (included in wavelength-multiplexed signal light) having almost the same intensity spectrum are input to the EDFA, the wavelength-multiplexed signal light is amplified at once by the EDFA and output therefrom. The output wavelength-multiplexed signal light is amplified as shown on the upper side of FIG. 2. As for the intensity spectrum, a signal light component having a wavelength close to the center wavelength of this wavelength range (first wavelength range) has the highest intensity, and the intensity decreases as the wavelength shifts from the center wavelength.

The optical filter 20 according to the present invention has a predetermined transmission spectrum in which the transmission loss changes depending on the wavelength when the wavelength-multiplexed signal light (having wavelengths different from each other) having such an intensity spectrum is input to the optical filter 20. The optical filter 20 equalizes the gain spectrum of the wavelength-multiplexed signal light. For the transmission spectrum, in a wavelength range (second wavelength range) which is narrower than the wavelength range of the input light (having wavelengths different from each other) and included in the first wavelength range, the transmission loss is large as the wavelength is close to the center wavelength of the wavelength range. The difference between the maximum loss and the minimum loss substantially equals that between the maximum gain and the minimum gain in the wavelength range of the input light.

As seen in FIG. 12, the maximum and minimum gains of the amplified wavelength-multiplexed light to be input to the optical filter 20 according to the present invention are represented by $P_1$ (dB) and $P_2$ (dB), respectively, in the first wavelength range ($\lambda_4$–$\lambda_1$:$\lambda_1$ is the minimum wavelength). FIG. 2 also depicts $\lambda_4$ is the maximum wavelength), and the maximum and minimum losses of the optical filter 20 according to the present invention in the second wavelength range ($\lambda_3$–$\lambda_2$) which are represented by $L_1$ (dB) and $L_2$ (dB), respectively. In this case, the wavelength corresponding to the maximum intensity of the input signal light components is close to the center wavelength of the first wavelength range, and the wavelength corresponding to the minimum intensity of the input signal light components is the minimum wavelength $\lambda_1$ or maximum wavelength $\lambda_4$ in the first wavelength range. The wavelength for giving the maximum loss $L_1$ of the optical filter 20 is close to the center wavelength of the second wavelength range, and the wavelength for giving the minimum loss $L_2$ of the optical filter 20 is the minimum wavelength $\lambda_2$ or maximum wavelength $\lambda_3$ in the second wavelength range. In addition, relations (1) and (2) below are held among these parameters:

$$\lambda_1 < \lambda_2 < \lambda_3 < \lambda_4 \tag{1}$$

$$L_1 - L_2 = P_1 - P_2 \tag{2}$$

The optical filter 20 according to the present invention has such a transmission spectrum. Therefore, even when the center wavelength (wavelength for giving the maximum loss) changes depending on a change in temperature, the degradation in equalizing performance to the wavelength-multiplexed signal light is small. In addition, the allowance for manufacturing variations in the center wavelength or operation wavelength range (the width of the second wavelength range which satisfies equation (2) above) is large. Particularly, when a ratio R of the width of the operation wavelength range (second wavelength range) of the optical filter 20 to the width of the first wavelength range of the input light (having a plurality of wavelengths ), as represented by equation (3) below, is 0.65 (65%) or more, the intensity deviation of output light (having a plurality of wavelengths) or a degradation in transmission characteristic such as an effective NF worst value becomes advantageously small:

$$R = (\lambda_3 - \lambda_2)/(\lambda_4 - \lambda_1) \tag{3}$$

The optical filter 20 according to the present invention can be constituted by a fiber grating and is therefore compact and inexpensive. The insertion loss in inserting the optical filter 20 in the optical fiber transmission line 100 is small. In addition, a desired loss spectrum can be easily designed and manufactured.

Figure 3:
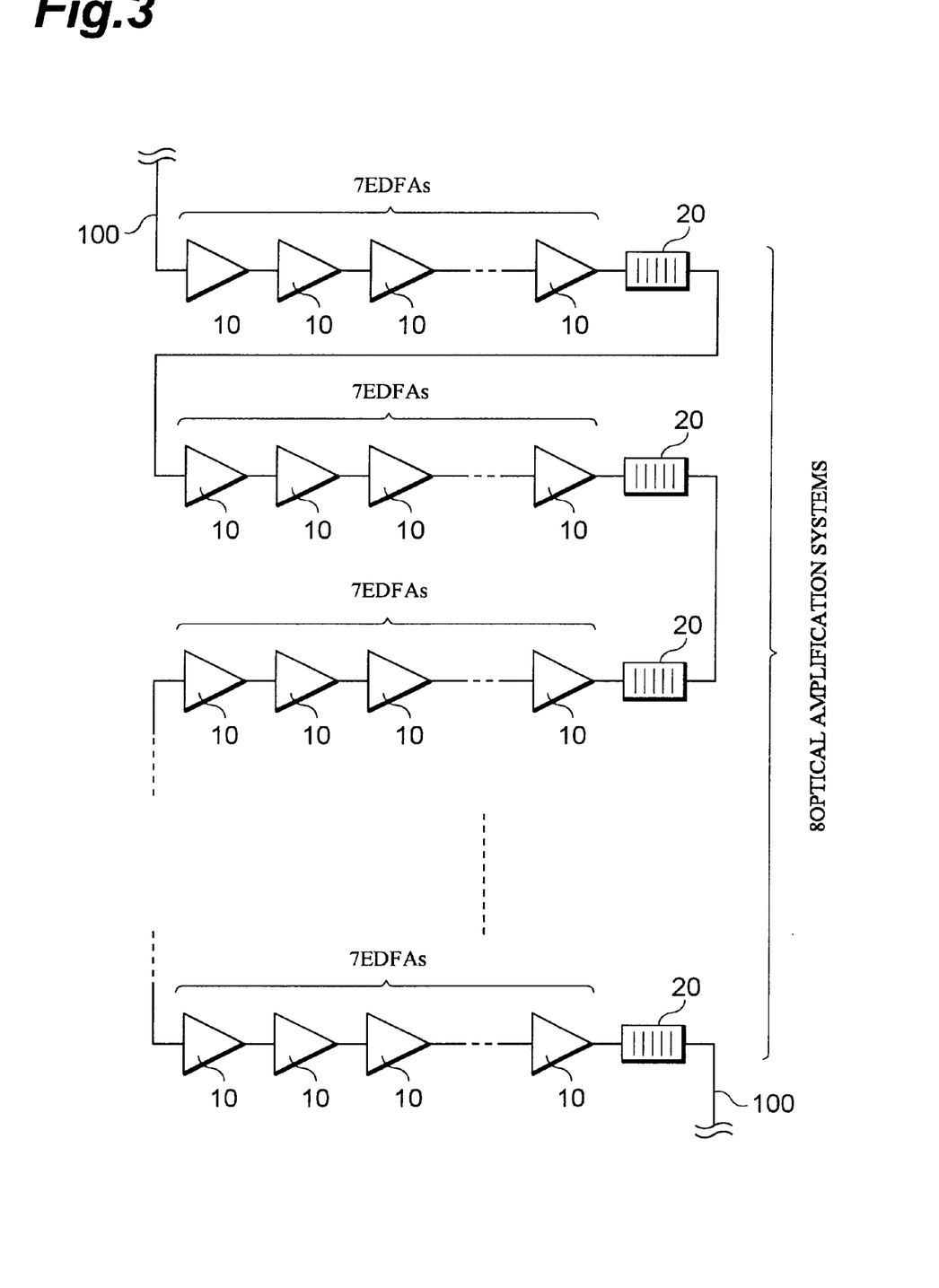
FIG. 3 is a view showing the detailed structure of the optical transmission system (including the optical amplification system) according to the present invention.

The result of simulation will be described below. This simulation was conducted for an optical transmission system in which 56 EDFAs 10 as shown in FIG. 3 are cascaded, and one optical filter 20 is connected every seven EDFAs 10. That is, in the designed optical transmission system, eight optical amplification systems 120 each having seven EDFAs 10 (constituting the optical amplification unit 110) and an optical filter 20 connected to the output terminal of the EDFAs 10 are cascaded in the transmission line 100.

The amplification optical fiber of each EDFA was constituted by an Er-doped optical fiber (EDF). The length was 7.0 m, the Er (erbium) concentration was 500 ppm, the Al (aluminum) concentration was 1.4 wt %, the mode field diameter was 3.9 µm, and the Er doping diameter was 1.4 µm. Each EDFA was of a backward excitation type. The wavelength of excitation light was 1,480 nm, and the intensity of the excitation light was 8.0 mW. The distance of the optical fiber transmission line between the EDFAs was 40 km, and the transmission loss between the EDFAs was 10.0 dB. The number of waves (signal light components) of wavelength-multiplexed signal light was 8, and the wavelengths of the respective signal light components were 1551.0, 1552.5, 1554.0, 1555.5, 1557.0, 1558.5, 1560.0, and 1561.5 nm. The width of the wavelength range was 10.5 nm (1561.5 ($\lambda_4$)–1551.0 ($\lambda_1$)=10.5). The intensity of the wavelength-multiplexed signal light input to the first EDFA was –16.2 dBm/ch. The preemphasis was 0 dB.

Preferably, the applicable optical filter 20 is designed as follows:

The photoinduced refractive index change in the core ($\Delta n$):$3.0 \times 10^{-5}$ Grating period ($\Lambda$):400 (µm) to 450 (µm)

Grating length (L):15 (mm) to 30 (mm)

Here, $\Delta$ denotes the relative refractive index difference between a region of the grating which has a maximum refractive index and a region of the grating which has a minimum refractive index.

Figure 4:
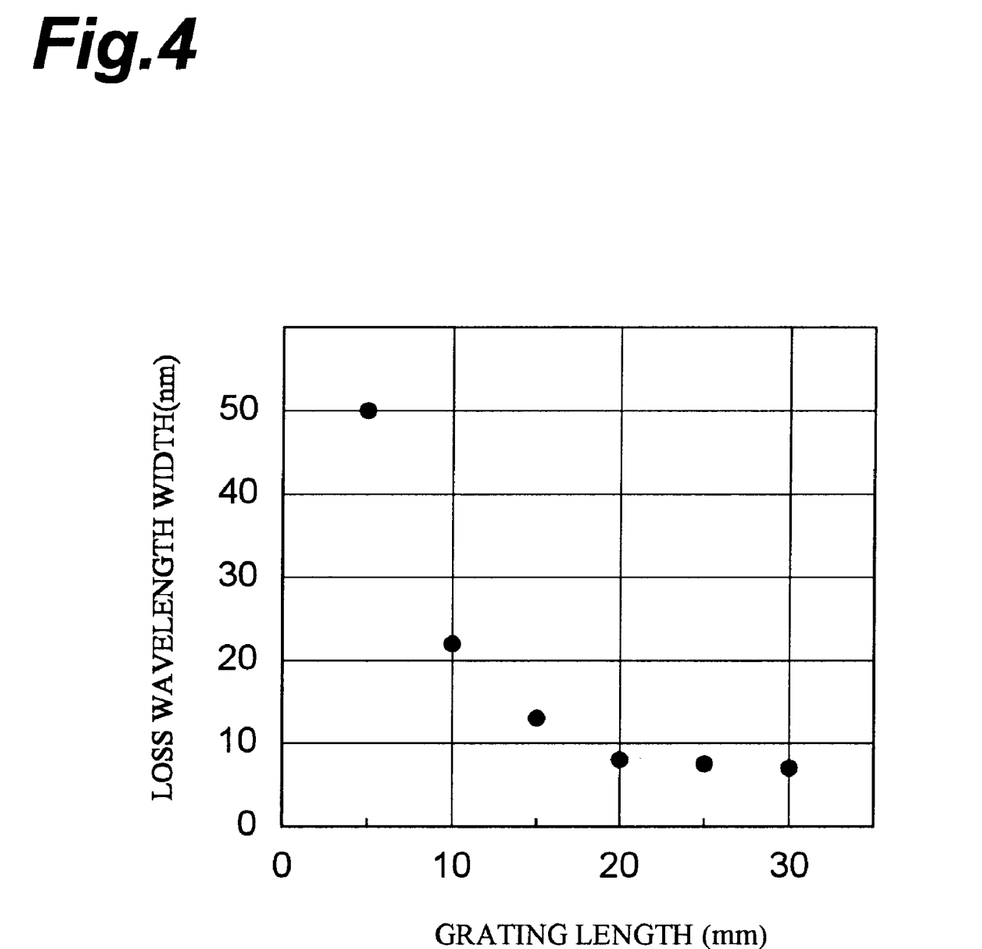
FIG. 4 is a graph showing the relationship between the grating length and loss wavelength width of the optical filter.

As is known, the grating length (L) depends on the loss wavelength width, as shown in FIG. 4. The loss wavelength width means the wavelength interval between to a minimum transmission wavelength $\lambda_0$ (center wavelength for giving the maximum loss) and a wavelength at which the difference to the loss at the minimum transmission wavelength $\lambda_0$ of the optical filter 20 is 0.3 dB. Therefore, considering the width of the first wavelength range of the assumed wavelength-multiplexed signal light (the width is defined by the difference between the maximum signal light wavelength and the minimum signal light wavelength), the grating length (L) is preferably set within the range of 15 (mm) to 30 (mm), as described above.

Figure 5:
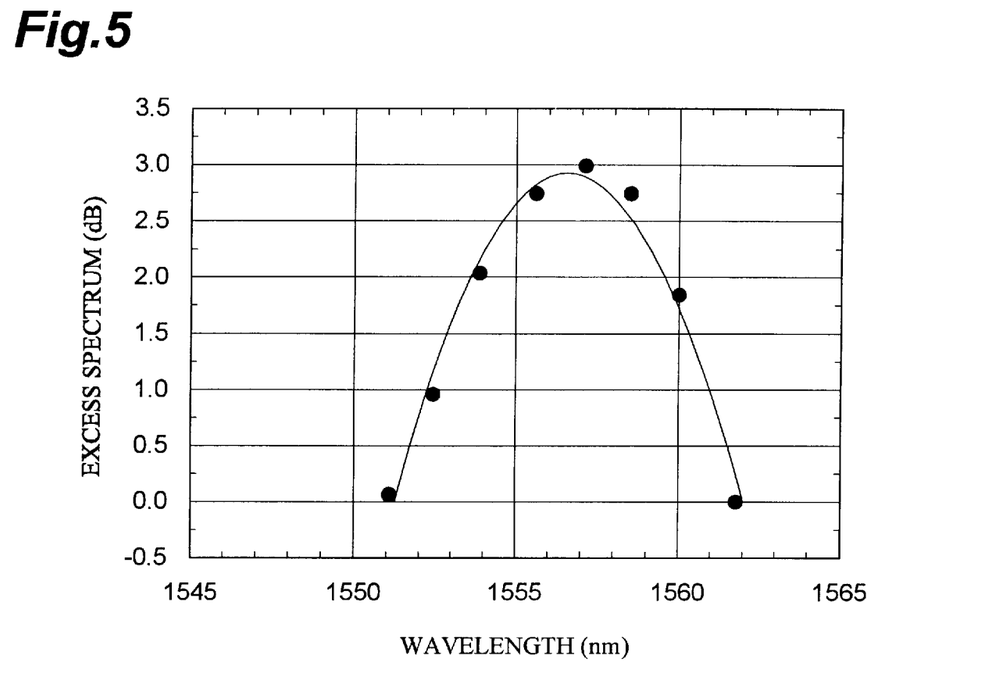
FIG. 5 is a graph showing a gain spectrum obtained by the optical amplification unit (seven EDFAs are cascaded) shown in FIG. 1.

When seven EDFAs 10 are cascaded (when the optical amplification unit 110 is constituted by seven EDFAs 10), the seventh EDFA outputs a gain spectrum as shown in FIG. 5. In this graph, the abscissa represents the wavelength (nm) of the wavelength-multiplexed signal light, and the ordinate represents the increase amount (dB) of the signal light intensity relative to the required signal light intensity (10 dB) at each wavelength. A symbol ● indicates the simulation result of the intensity of each signal light component. A curve in the graph indicates the simulation result of the intensity of each signal light component, which is fitted by a quadratic function. When the signal light intensity is represented by y (dB), and the wavelength is represented by x (nm), the quadratic function is represented by equation (4) below:

$$y = -2.5330 \cdot 10^5 + 325.48x - 0.10456x^2 \quad (4)$$

The correlation coefficient is 0.957.

As is apparent from this graph, the signal light intensity increases as the wavelength is close to the center wavelength of the wavelength range. The signal light intensity is minimized at the minimum and maximum wavelengths. The difference between the maximum gain and the minimum gain is 2.9 dB. The intensity spectrum of the increase in signal light is satisfactorily fitted to the quadratic function curve represented by equation (4) above.

Figure 6:
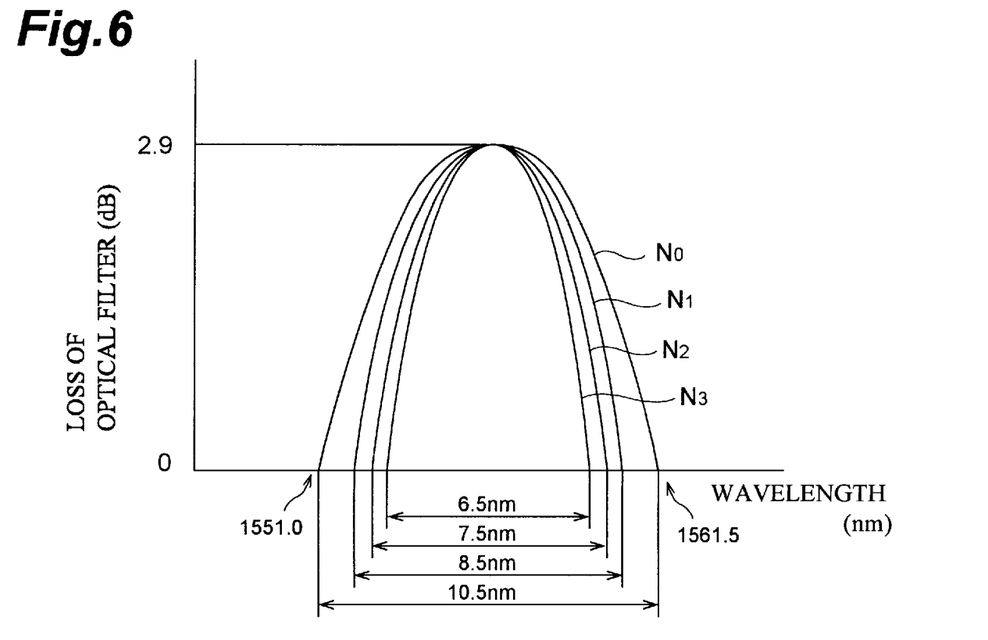
FIG. 6 is a graph showing the transmission spectra (loss spectra) of the optical filters of various types ($N_0$–$N_3$) according to the present invention.

For the transmission spectrum of the optical filter 20, four types were prepared, as shown in FIG. 6. Type $N_0$ has the transmission spectrum represented by equation (4) within the same wavelength range (R=1) as that (10.5 nm) of the wavelength-multiplexed signal light. Types $N_1$, $N_2$, and $N_3$ have transmission spectra in which the difference between the maximum loss and the minimum loss equals the difference between the maximum and minimum gains of the wavelength-multiplexed signal light, i.e., 2.9 dB, within the wavelength ranges of 8.5 nm (R≈0.8), 7.5 nm (R≈0.7), and 6.5 nm (R≈0.6), respectively. Each spectrum has a shape corresponding to the transmission spectrum of type $N_0$ reduced only along the wavelength axis. In the transmission spectrum of the optical filter 20 of each type, the center wavelength shift (a change in wavelength for giving the maximum loss) depending on a change in temperature is represented as a translation along the wavelength axis.

The optical transmission quality in this optical transmission system can be determined on the basis of the intensity deviation and effective NF worst value of the output light (including the amplified signal light components). More specifically, when the intensity deviation of the output light is larger than a predetermined value, some signal light components having wavelengths with low intensities can hardly be detected. The intensity deviation of output light is preferably 10 dB or less. When the effective NF is large, the output light can still hardly be detected. Therefore, the effective NF worst value is preferably small. The effective NF is given by equation (5) below:

$$\text{Effective } NF = (ASE \text{ light intensity}) / (h \cdot v \cdot \Delta v \cdot \text{effective gain}) \quad (5)$$

where h is the Plank's constant, v is the frequency of each signal light component, and $\Delta v$ is the ASE (Amplified Spontaneous Emission) light intensity measurement resolving power. The effective gain corresponds to the intensity ratio of the output light to the input light in this optical transmission system. The effective NF worst value is the worst value of the effective NF values of each signal light component.

Figure 7:
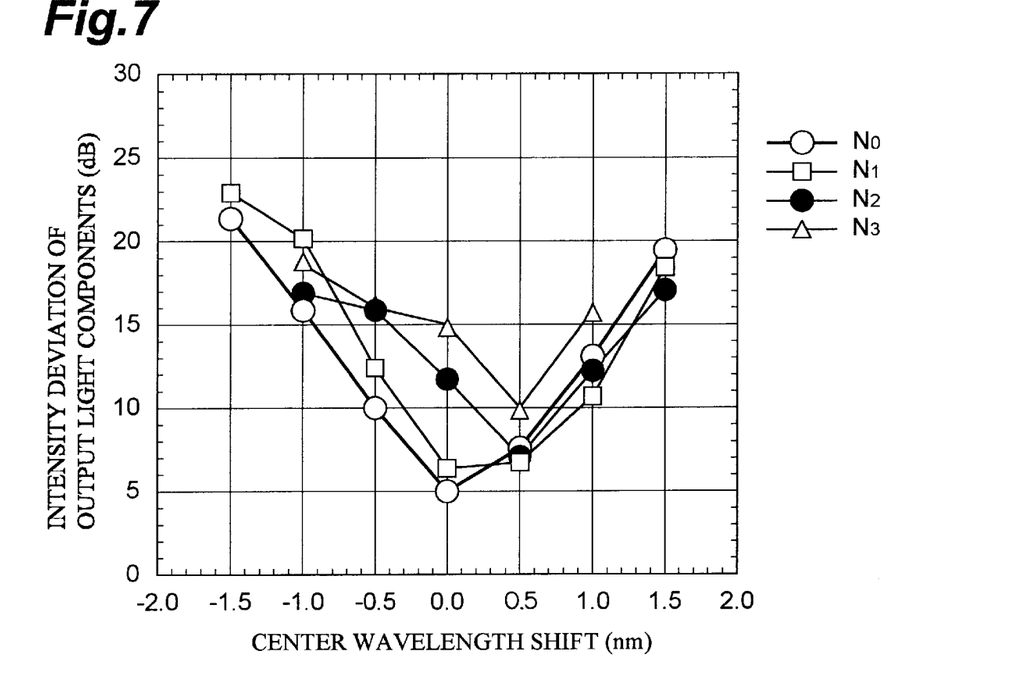
FIG. 7 is a graph showing the relationship between the intensity deviation of signal light components output from the optical amplification system and the center wavelength shift (the change amount of the wavelength for giving the maximum loss) of the optical filter in the second wavelength range in the optical transmission system shown in FIG. 3.

FIG. 7 shows the dependency, on the center wavelength shift, of the intensity deviation of the wavelength-multiplexed signal light output through the above-described optical transmission system. In this graph, the abscissa represents the center wavelength shift (nm) of the transmission spectrum of the optical filter 20, and the ordinate represents the intensity deviation of the signal light components (the difference between the maximum intensity and the minimum intensity, dB). Symbols ○, □, ●, and Δ respectively indicate the simulation results of the intensity deviations of output light (having a plurality of wavelengths) in use of the optical filters 20 having the transmission spectra of types $N_0$, $N_1$, $N_2$, and $N_3$ shown in FIG. 6.

Figure 8:
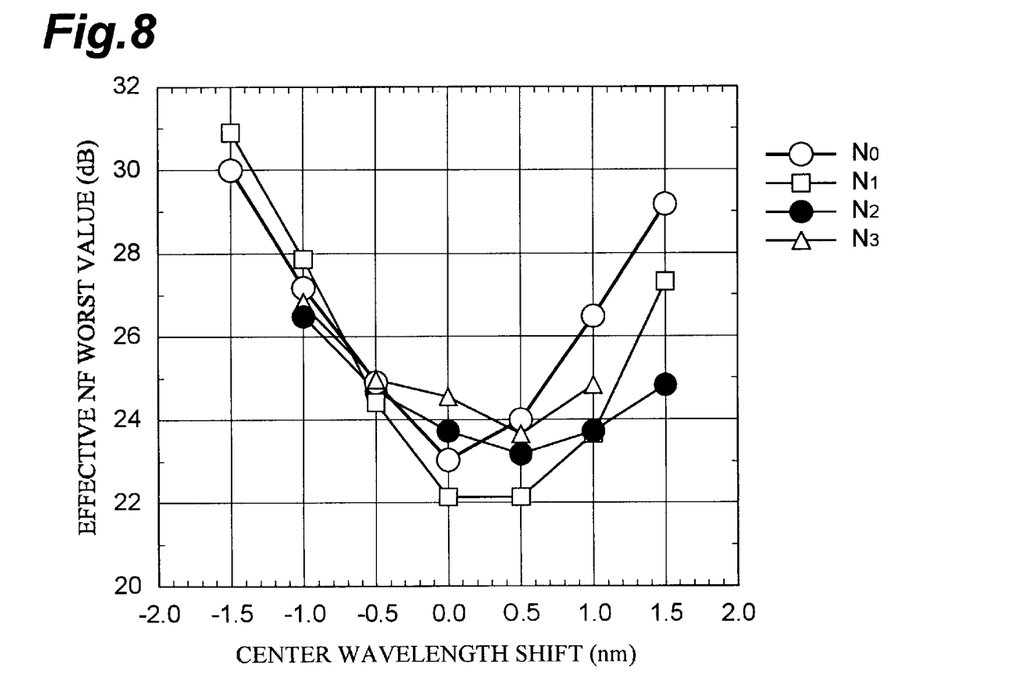
FIG. 8 is a graph showing the relationship between the effective NF worst value of signal light components output from the optical amplification system and the center wavelength shift (the change amount of the wavelength for giving the maximum loss) of transmission loss in the optical transmission system shown in FIG. 3.

FIG. 8 shows the dependency, on the center wavelength shift, of the effective NF worst value of the wavelength-multiplexed signal light output through the transmission system. In this graph, the abscissa represents the center wavelength shift (nm) of the transmission spectrum of the optical filter 20, and the ordinate represents the effective NF worst value (dB). Symbols ○, □, ●, and Δ respectively indicate the simulation results of the effective NF worst values in use of the optical filters 20 having the transmission spectra of types $N_0$, $N_1$, $N_2$, and $N_3$ shown in FIG. 6.

Assuming that there is no center wavelength shift, the following facts become apparent from FIGS. 7 and 8 in comparison to the optical filter having the loss spectrum of type $N_0$. In using an optical filter having a transmission spectrum of type $N_1$, the intensity deviation of the output light having wavelengths different from each other slightly increases although it does not exceed 10 dB. The effective NF worst value is improved by about 1 dB as compared with type $N_0$. In using of the optical filter having the transmission spectrum of type $N_1$, the intensity deviation of output light is as large as about 12 dB although it falls within the allowance. The effective NF worst value degrades by about 0.7 dB as compared with type $N_0$. However, in use of the optical filter having the transmission spectrum of type $N_3$, the intensity deviation of the output light increases to about 15 dB outside the allowance, and the effective NF worst value degrades by about 1.7 dB as compared with type $N_0$.

Assuming that the degradation in effective NF worst value caused by the center wavelength shift is permitted up to 1 dB with reference to the effective NF worst value obtained when the center wavelength shift of the transmission spectrum of type $N_0$ is 0 nm. As is apparent from FIGS. 7 and 8, in use of the optical filter having the transmission spectrum of type $N_0$, the allowance of the center wavelength shift is 0.75 nm, i.e., from −0.25 nm to 0.50 nm. In use of the optical filter having the transmission spectrum of type $N_1$, the allowance of the center wavelength shift is 1.50 nm, i.e., from −0.40 nm to 1.10 nm. In use of the optical filter having the transmission spectrum of type $N_2$, the allowance of the center wavelength shift is 1.20 nm, i.e., from −0.15 nm to 1.05 nm. In use of the optical filter having the transmission spectrum of type $N_3$, the allowance of the center wavelength shift is 0.20 nm, i.e., from 0.40 nm to 0.60 nm. Even when the center wavelength shift is generated within the above-described range, the operation wavelength range (second wavelength range) of the optical filter 20 is included in the wavelength range (first wavelength range) of the input light having wavelengths different from each other.

Figure 9:
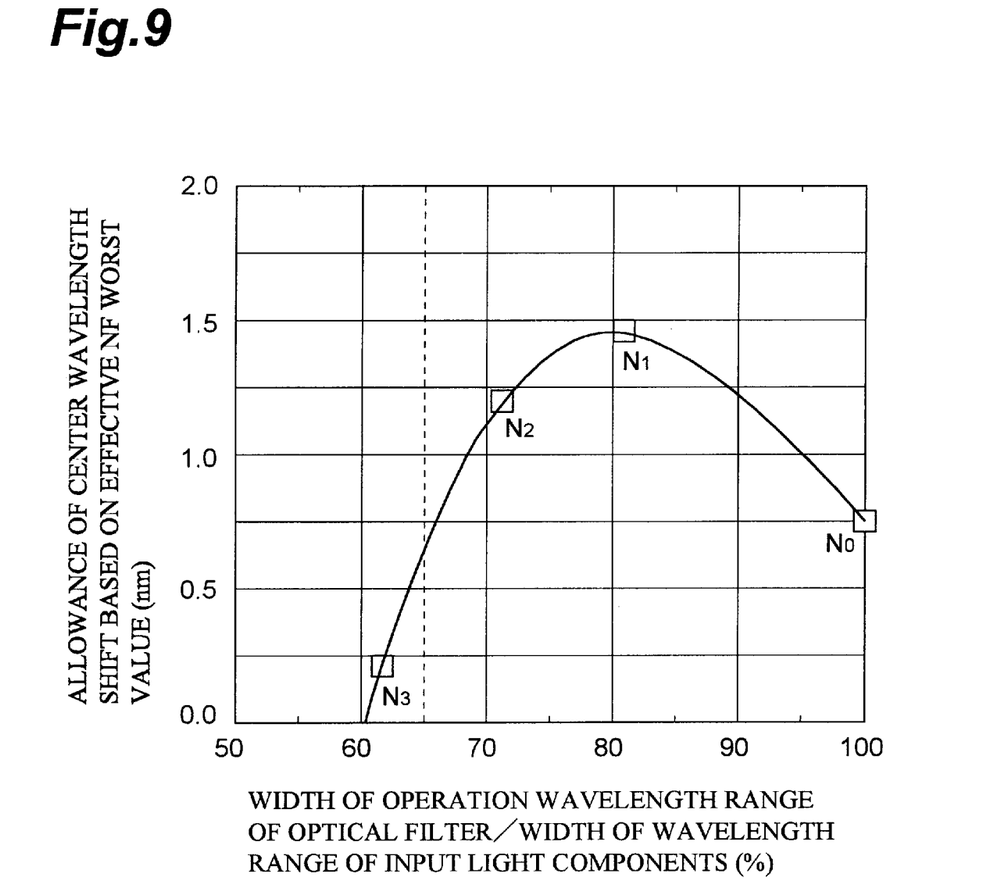
FIG. 9 is a graph showing the allowance of the center wavelength shift (the change amount of the wavelength for giving the maximum loss) of transmission loss for the optical filters of various types shown in FIG. 6, based on the effective NF worst value.

FIG. 9 shows the allowance of the center wavelength shift based on the effective NF worst value for each of types $N_0$ to $N_3$. In this graph, the abscissa represents the ratio of the width of the operation wavelength range (second wavelength range) of the optical filter 20 to the width of the wavelength range (first wavelength range) (10.5 nm) of the input light having wavelengths different from each other, and the ordinate represents the allowance of the center wavelength shift assuming that the center wavelength shift is permitted up to 1 dB on the basis of the effective NF worst value obtained when the center wavelength shift in the transmission spectrum of type $N_0$ is 0 nm. As is apparent from this graph, the allowance of the center wavelength shift for the transmission spectrum of type $N_1$ is increased twice, and that for type $N_2$ is extended 1.6 times that of the transmission spectrum of type $N_0$. However, for the transmission spectrum of type $N_3$, the allowance value of the center wavelength shift is reduced.

If a fiber grating is used as the optical filter 20, the dependency of the center wavelength shift of the fiber grating on the temperature is generally about 0.05 nm/° C., as is known. For the optical filter having the transmission spectrum of type $N_0$, a temperature change only within the range of 15° C. (=0.75 (nm)/0.05 (nm/° C.)) is permitted. However, for the optical filter having the transmission spectrum of type $N_1$, the allowance of the temperature change is increased to 30° C. (=1.50 (nm)/0.05 (nm/° C.)). For the optical filter having the transmission spectrum of type $N_2$, the allowance of the temperature change is increased to 24° C. (=1.20 (nm)/0.05 (nm/° C.)).

If the above-described fiber grating proposed by J. B. Judkins et al. is used as the optical filter, the dependency of the center wavelength shift of this fiber grating on the temperature is about –0.005 nm/° C. For the optical filter having the transmission spectrum of type $N_0$, a temperature change within the range of about 150° C. (=0.75 (nm)/0.005 (nm/° C.)) is permitted. However, for the optical filter having the transmission spectrum of type $N_1$, the allowance of the temperature change is increased to 300° C. (=1.50 (nm)/0.005 (nm/° C.)).

For the optical filter having the transmission spectrum of type $N_2$, the allowance of the temperature change is increased to 240° C. (=1.20 (nm)/0.005 (nm/° C.)).

As described above, the allowance of the center wavelength shift is associated with the allowance of the temperature change in use. The allowance of the center wavelength shift also equals to the allowance of the center wavelength variation in manufacturing. More specifically, the allowance of manufacturing variation associated with the center wavelength shift for the optical filter having the transmission spectrum of type $N_1$ is increased twice, and that for type $N_2$ is extended 1.6 times that of the optical filter having the transmission spectrum of type $N_0$.

For any one of the optical filters having the transmission spectra of types $N_0$, $N_1$, and $N_2$, the intensity deviation of output light falls within the allowance, the effective NF worst value rarely degrades, and the allowance of the center wavelength shift based on the effective NF worst value is increased. For this reason, these optical filters can be suitably used for an optical transmission system. However, for the optical filter having the transmission spectrum of type $N_3$, the intensity deviation of the output light exceeds 10 dB for almost all center wavelength shifts, and the allowance of the center wavelength shift based on the effective NF worst value is reduced. Therefore, this optical filter is not suitable for an optical transmission system.

The allowance of the center wavelength shift based on the effective NF worst value is increased when, in the transmission spectrum of the optical filter 20, the ratio of the width of the operation wavelength range (second wavelength range) of the optical filter 20 to the width of the wavelength range (first wavelength range) of the input light is about 65% or more. Within this range, the intensity deviation of the output light also falls within the allowance. Therefore, with the transmission spectrum in which the ratio of the width of the second wavelength range to the width of the first wavelength range is about 65% or more, the optical filter according to the present invention is suitable for the optical transmission system.

As the currently available optical filter 20 (fiber grating), an optical fiber whose dependency of the center wavelength on the temperature is about 0.036 nm/° C. can be selected. When an EDFA is installed on the seabed, the temperature difference between the seabed and the ground is normally said to be about 40° C. At the present time, however, the temperature on the ground can be assumed to be about 25° C. (room temperature) by improving the heat dissipation characteristics of the EDFA. Therefore, when the allowance of the center wavelength shift of the optical filter 20 is calculated using these numerical data, the following value can be obtained:

$$0.036 \text{ (nm/° C.)} \times 25 \text{ (° C.)} = 0.9 \text{ (nm)}$$

To satisfy the calculated maximum allowance of the center wavelength shift of the optical filter 20, the second wavelength range (the operation wavelength range of the optical filter 20) must be set within the range of 68% to 97% of the first wavelength range, as is apparent from FIG. 9.

The transmission spectrum of the optical filter 20 must be appropriately designed and manufactured in accordance with the wavelength range of input signal light components and the gain spectrum of the optical amplification unit 110, and a person skilled in the art can easily design and manufacture an optical filter having a desired transmission spectrum. In particular, when, in a predetermined wavelength range, the shape of the transmission spectrum of the optical filter has the maximum loss within the wavelength range and can be approximated by a quadratic function, the optical filter having the transmission spectrum can be designed and manufactured without any difficulty.

The present invention is not limited to the above embodiment, and various changes and modifications can be made. For example, the optical filter 20 according to the present invention is not limited to the fiber grating and may be a dielectric multilayered filter.

As has been described above in detail, the optical filter according to the present invention equalizes the gain spectrum of the optical amplification unit for amplifying the wavelength-multiplexed signal light in the first wavelength range (defined as a difference between a maximum wavelength and a minimum wavelength of the wavelength-multiplexed signal light). In the second wavelength range narrower than the first wavelength range and included in the first wavelength range, the optical filter has a transmission loss spectrum in which the difference between the maximum transmission loss and the minimum transmission loss substantially equals the difference between the maximum gain and the minimum gain of the gain spectrum in the first wavelength range. Therefore, even when a center wavelength shift is generated by a change in temperature or variations in manufacturing conditions, the equalizing characteristic does not degrade, or if any, the allowance for the change in temperature or variations in manufacturing conditions is increased.

The optical transmission system to which the optical filter according to the present invention is applied is constituted by substantially connecting the optical amplification unit and the optical filter. The optical amplification unit has a gain spectrum in which, in the first wavelength range, the maximum gain is obtained at a wavelength near the center of the first wavelength range. On the other hand, the optical filter has a transmission loss spectrum in which, in the second wavelength range narrower than the first wavelength range and included in the first wavelength range, the difference between the maximum transmission loss and the minimum transmission loss substantially equals the difference between the maximum gain and the minimum gain of the optical amplification unit in the first wavelength range. Therefore, the gain spectrum of the entire optical transmission system is obtained by integrating the gain spectrum of the optical amplification unit and the transmission loss spectrum of the optical filter. Even when a center wavelength shift is generated by the change in temperature or variations in manufacturing conditions of the optical filter, the optical transmission characteristic of the entire optical transmission system does not degrade, or if any, the degradation of the characteristic is minimum.

Particularly, when the width of the second wavelength range is 65% to 97% of that of the first wavelength range, the equalizing characteristic and optical transmission characteristic are improved as compared with the optical filter having a transmission loss spectrum for exactly canceling the gain spectrum (the second wavelength range matches the first wavelength range). When the optical filter has a fiber grating in which a diffraction grating is formed in an optical fiber, a compact and inexpensive optical fiber whose insertion loss in insertion in the optical fiber transmission line is small can be easily designed and manufactured.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 149395/1996 filed on Jun. 11, 1996 is hereby incorporated by reference.

What is claimed is:

1. An optical filter for flattening a target gain peak in a gain spectrum, said gain spectrum corresponding to a plurality of amplified signal light components having different wavelengths within a first wavelength range defined as a difference between a maximum wavelength and a minimum wavelength, said target gain peak having a gain difference defined as a difference between a maximum gain and a minimum gain within a peak-defining wavelength range, said optical filter having:

a transmission spectrum with inverse characteristics to those of said target gain peak, said transmission spectrum containing a loss difference defined by a difference between a maximum loss and a minimum loss within a second wavelength range, said loss difference being substantially equal to said gain difference of said target gain peak, wherein said second wavelength range corresponds to said loss difference and is narrower than, and included within, said peak-defining wavelength range, and said peak-defining wavelength range corresponds to said target gain peak and is narrower than, and included within, said first wavelength range.

2. A filter according to claim 1, wherein the second wavelength range is not less than 65% of the peak-defining wavelength range.

3. A filter according to claim 1, wherein the second wavelength range is 65% to 97% of the peak-defining wavelength range.

4. A filter according to claim 1, wherein said optical filter includes an optical fiber in which a diffraction grating is formed along a light traveling direction.

5. An optical transmission system including an optical amplification system for amplifying a plurality of signal light components having different wavelengths within a first wavelength range, said optical amplification system comprising:

an optical amplification unit for amplifying the plurality of signal light components included within said first wavelength range, said first wavelength range being defined by a difference between a maximum wavelength and a minimum wavelength;

an optical amplification unit gain spectrum, associated with said first wavelength range, containing a target gain peak, said target gain peak defined by a gain difference between a maximum gain and a minimum gain within a peak-defining wavelength range; and an optical filter for flattening said target gain peak, said optical filter being optically coupled to said optical amplification unite; and an optical filter transmission spectrum having inverse characteristics to those of said target gain peak and containing a loss difference defined by a difference between a maximum loss and a minimum loss within a second wavelength range, said loss difference being substantially equal to said rain difference of said target gain peak, wherein said second wavelength range corresponds to said loss difference and is narrower than, and included within, said peak-defining wavelength range, and said peak-defining wavelength range corresponds to said target gain peak and is narrower than, and included within, said first wavelength range.

6. A system according to claim 5, wherein the second wavelength range is not less than 65% of the peak-defining wavelength range.

7. A system according to claim 5, wherein the second wavelength range is 65% to 97% of the peak-defining wavelength range.

8. A system according to claim 5, wherein said optical filter includes an optical fiber in which a diffraction grating is formed along a light traveling direction.

9. A system according to claim 5, wherein said optical amplification unit comprises at least one optical amplifier.

10. A system according to claim 5, wherein said optical amplification unit comprises a plurality of optical amplifiers, and adjacent optical amplifiers of said plurality of optical amplifiers are optically connected.

* * * * *